Feb. 8, 1966   J. H. STANLEY ETAL   3,233,924
HIGH PRESSURE COUPLING
Filed April 18, 1963
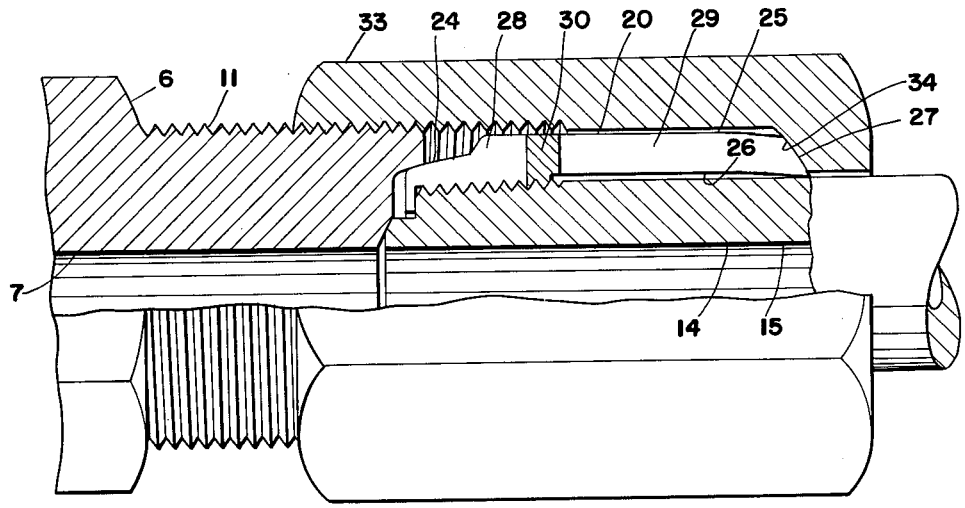
Fig. 1
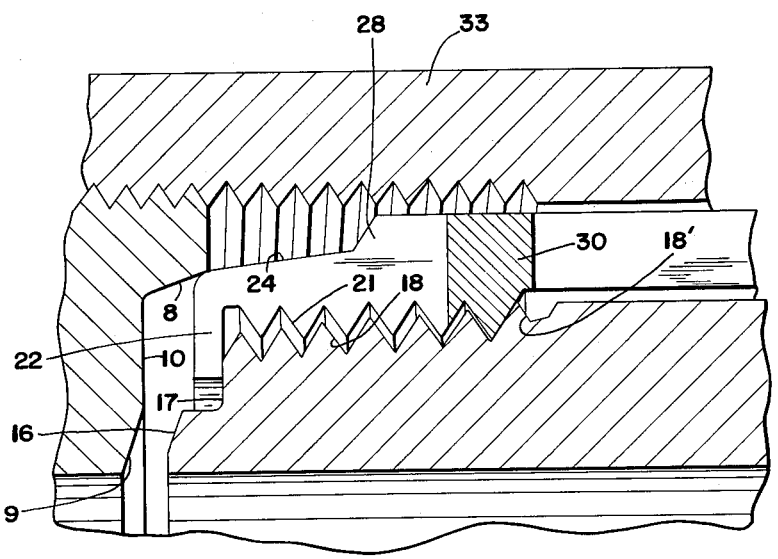
Fig. 2
Fig. 3
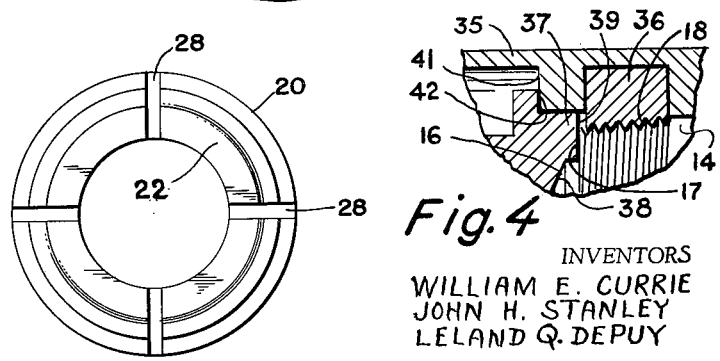
Fig. 4
INVENTORS
WILLIAM E. CURRIE
JOHN H. STANLEY
LELAND Q. DEPUY
BY John N. Wolfram
ATTORNEY

United States Patent Office 3,233,924
Patented Feb. 8, 1966

3,233,924
HIGH PRESSURE COUPLING
John H. Stanley, Euclid, William E. Currie, Cleveland Heights, and Leland Q. De Puy, Cleveland, Ohio, assignors to Parker-Hannifin Corporation, Cleveland, Ohio, a corporation of Ohio
Filed Apr. 18, 1963, Ser. No. 273,906
7 Claims. (Cl. 285—322)

This invention relates to pipe couplings and more particularly to pipe couplings suitable for use with fluid pressures of 10,000 p.s.i. and over.

Pipes for very high fluid pressures necessarily have a thick wall for withstanding the pressure. The high fluid pressure also imposes a large force upon the pipe in an axial direction tending to blow it out of any coupling to which it may be assembled.

In a known form of coupling for such high pressures, the pipe has a seat machined on its end face and has a straight thread upon which a collet is threaded. The collet is engaged by a nut which is threaded upon a coupling body for clamping the seat on the pipe against a seat in the body.

Such a coupling has a number of disadvantages. One is that it is difficult to form a straight thread on commercial pipe because the outside diameter of the pipe is not sized for such threading. Another disadvantage, particularly with the larger sizes of couplings, is that the collet and pipe tend to turn with the nut causing turning of the pipe seat against the seat in the body. To avoid galling action due to such turning it is the present practice to insert a separate seat member of hard material and with polished sealing surfaces between the pipe and body. This results in an additional leakage path to be sealed.

A further disadvantage is that the straight thread does not provide a stop for the collet so that the collet will assume a predetermined axial spacing with respect to the seat on the conduit. Moreover, a certain amount of radial and axial play exists in the straight threads so that the collet will have a certain amount of looseness which results in a weakened connection and also permits the collet to change its threaded position upon the pipe during assembly.

It is an object of the present invention to overcome the difficulties mentioned above. The accomplishment of this object includes the forming of a tapered thread upon the pipe with a special tool which also forms the seat in a predetermined position with respect to the tapered thread. This tool, although special in that it forms a seat as well as a tapered thread on the pipe, utilizes thread cutting chasers which are readily available.

In the present invention the collet has a stop engageable with a part of the pipe for properly locating the axial position of the collet on the pipe. The collet is straight threaded to eliminate close sizing and gaging and has a portion for wedging into a tapered section of the body to prevent turning of the collet and tube by the nut. The collet is split from both ends to permit the straight threaded portion to contract tightly into engagement with the tapered thread of the pipe and to permit an unthreaded portion of the collet to grip an unthreaded portion of the pipe. Suitable coupling body and nut members are provided for engaging the collet to clamp the seat on the pipe tightly against a seat on the coupling body.

A tool for facing and taper threading a pipe for use with the couplings herein described is disclosed in patent application Serial No. 254,087. Such a tool, although being special for use in connection with the present invention, utilizes chasers which are readily available.

With the above the other objects in view that will hereinafter appear, the invention will be more clearly understood from the following description and from the drawings in which:

FIG. 1 is a longitudinal partial cross-section view of the coupling in a tightly assembled position, FIG. 2 is a fragmentary cross-section view showing the loosely assembled position, FIG. 3 is an end view of the collet, and FIG. 4 is a fragmentary section view of a tool for forming a tapered thread, a stop shoulder and a seat upon the pipe.

The coupling includes a body 6 having a fluid passage or bore 7 therethrough, a counterbore with a tapered wall 8, a tapered seat 9 at the inner margin of bottom wall 10 of the counterbore, and a straight right handed thread 11.

Pipe 14 has a bore 15, a tapered seat 16, a transverse shoulder 17, and a left hand tapered thread 18.

Collet 20 has a straight left hand thread 21 engaged with tapered thread 18 and an internal flange 22 butted against pipe shoulder 17 to space the collet a predetermined axial distance from seat 16. The collet also has a tapered cam surface 24 at its front end and has an extension 25 with a smooth bore 26, the outer end of extension 25 having a tapered surface 27. The inner end of the collet has several circumferentially spaced axially extending slots 28 and the outer portion of the sleeve is similarly slotted as at 29, there being an intermediate unslotted portion 30.

Nut 33 is threaded upon body 11 and has a tapered shoulder 34 in engagement with collet surface 27.

In forming seat 16, shoulder 17 and tapered thread 18 upon pipe 14 with a tool such as shown in FIG. 4, a holder 35 is utilized which may be used with standard pipe threading machines in common use. Holder 35 carries chasers 36 for cutting tapered thread 18 upon the pipe and also carries a seating tool 37 having a cutting edge 38 for forming seat 16 upon the pipe and another cutting edge 39 for forming transverse shoulder 17 on the pipe. Holder 35 has a shoulder 41 a fixed axial distance from threading die element 36. Cutting tool 37 has a flange 42 engageable with shoulder 41 for limiting the cutting action of edges 38, 39 so that seat 16 and shoulder 17 will have a predetermined axial position with respect to tapered thread 18. This predetermined position is such that the plane or projection of seat 16 intersects the projected pitch line of tapered thread 17 at a given diameter. Since cutting edges 38, 39 are on the same tool member 37, seat 16 and shoulder 17 on the pipe will likewise be spaced a predetermined axial distance from each other.

With seat 16, shoulder 17, and thread 18 formed on the pipe in this manner, concentricity of the seat with the thread is assured. Moreover, since the thread is tapered there is a self-centering action of the thread upon the pipe as the thread is being cut which is not obtainable when forming straight threads upon a pipe. Also, there is no special shaving or turning operation on the outside diameter of the pipe that is required before the threading operation, as is the case with straight threading due to the outside diameter tolerance range permitted for commerical pipe.

In making up the coupling after the pipe has been tapered, threaded and formed with seat 16 and shoulder 17, the collet 20 is slipped over the pipe and is then threaded into place until flange 22 butts against shoulder 17. At this time the one or two straight threads 21 which are within unsplit portion 30 of the collet are a close fit upon the last one or two tapered threads 18 which are of full form, the unengaged threads 18' on the pipe being imperfect or not of full form due to lead chamfer on the dies used for threading the pipe and also due to the fact that the crest of the imperfect thread can be no larger than the original diameter of pipe 14.

Tapered pipe thread 18 conforms to the specification of American Standard Pipe Thread (left hand) as used on commercial pipe sizes. This specification provides a given number of full threads, all of which are not normally engaged when a standard tapered external pipe thread is made up with a standard internal tapered pipe thread. In order to utilize both a standard external tapered pipe thread on pipe 14 and all of the full threads thereof, it is preferable that internal thread 21 in the collet be straight rather than tapered. This permits the forming of as many full threads 21 in the collet as necessary for engaging all of the tapered threads 18 of full form.

If thread 21 were tapered and made with standard tapered pipe thread taps, there would be fewer full form internal threads engageable with tapered external thread 18 since standard pipe thread taps are dimensioned so that the tapered internal thread will be wedged tight upon the tapered external thread well before all the full threads of either are engaged. Thus to utilize a tapered thread for straight thread 21 with all of the threads engaged with the full threads on the pipe it would be necessary to provide special taps and gauges.

With straight thread 21 formed so that the threads within unsplit portion 30 of the collet are a close fit with the last full tapered pipe threads 18, the straight threads toward the inner end of the collet have an increasing looseness upon threads 18, as shown. The fit of threads 21 upon the tapered threads 18 of largest diameter is not a wedge fit and therefore the collet may be readily threaded upon the pipe until flange 22 butts against shoulder 17.

With collet 20 in place upon pipe 14 and nut 33 threaded upon body 6, tapered cam face 24 of the collet will freely enter the counterbore in body 6 only a very short distance and will then engage tapered wall 8 as shown in FIG. 1. At this time seat 16 of the pipe is spaced a slight distance from body seat 9.

Upon tightening of nut 33 upon body 6, the forward or threaded end of collet 20 will be radially contracted because of the engagement of tapered wall 8 with cam surface 24 until straight thread 21 assumes a tapered configuration and is tightly engaged with tapered thread 18 throughout substantially the entire length of thread 21. This securely locks the collet to the pipe with no appreciable axial or radial play at the threaded portions. Meanwhile, seat 16 of the pipe has engaged in tight sealing contact with body seat 9 and the extreme outer end portion of the collet has been radially contracted by tapered nut shoulder 34 into tight gripping engagement with an unthreaded portion of the pipe.

As nut 33 is threaded onto body 6, the engagement of nut shoulder 34 with end surface 27 of the sleeve tends to cause collet 20 to rotate with the nut. This is resisted by the wedging action of cam surface 24 of the collet against tapered wall 8 of the body. Any slight turning of will not yet be engaged and the collet will not be in tight the collet which may occur at the beginning of the tightening action will not be detrimental since seat 16 and 9 engagement with the pipe so that there is little or no tendency for the latter to turn. Since thread 11 is right handed and threads 18 and 21 are left handed, any initial tendency for collet 20 to turn with the nut will tend to cause the collet to become threaded more tightly upon the pipe so that there is no separation of flange 22 from shoulder 17. The taper of wall 8 is greater than the taper of thread 18, it being on the order of 10° whereas thread 18 is tapered about 1½°. On the other hand, the taper of wall 8 and surface 24 is less than the taper of nut shoulder 34 and collet surface 27, the latter being on the order of 45°. Thus the shallower taper of surfaces 8 and 24 provide a tighter wedge action and offer a greater resistance to turning than the tendency to turn caused by shoulders 34 and 27.

Although one form of the invention has been illustrated and described it is evident that other modifications may be made which come within the scope of the invention as claimed.

We claim:
1. A coupling comprising a body having a sealing surface and a conical wedging surface, a tubular conduit having a sealing surface and a tapered thread, a collet on said conduit and having a section which is initially straight threaded, a first portion of said straight threads engaging the largest diameter portion of the tapered threads with a close fit, a second portion of said straight threads being opposite the smaller diameter tapered threads and being contractible by engagement of the collet with the wedging surface for causing the straight threads of said second portion to contract in diameter so as to tightly engage the smaller diameter tapered threads, and a clamping member attached to the body for movement relative thereto, said clamping member having means thereon engageable with the collet for moving the collet and conduit toward the body whereby said collet engages said wedging surface and said conduit sealing surface engages said body sealing surface.

2. The coupling of claim 1 in which the collet has at least one slot extending longitudinally through said second portion to facilitate said contraction thereof.

3. The coupling of claim 2 in which said section is circumferentially continuous in the region of said first portion.

4. The coupling of claim 2 in which said section is circumferentially continuous in the region of said first portion and the collet has a longitudinally extending slot outwardly beyond said first portion, and the clamping member has a cam surface engageable with said slotted portion for contracting the same against said conduit.

5. A coupling comprising a body having a tapered sealing surface and an internal tapered wedging surface, a conduit having a sealing surface, a transverse shoulder, and a tapered thread, a collet having a threaded section in which the threads are initially straight and of a diameter to closely fit the largest diameter portion of the tapered threads, said collet being threaded upon said conduit with a first portion of the straight threads engaged with the largest of the tapered threads and with a second portion of the straight threads opposite the smaller of the tapered threads and with the stop shoulder in engagement with said transverse shoulder, said collet having at least one longitudinal slot through the stop shoulder and through said second portion, said collet having an outer portion with a longitudinal slot therein and with an outer shoulder thereon, said collet having a circumferentially continuous portion between said slotted portions, and a clamping member having a surface engageable with said outer shoulder for moving the collet into engagement with the wedging surface whereby said second portion is contracted to cause the straight threads thereof to engage the tapered threads of small diameter and for moving the conduit whereby the sealing surface thereon engages the body sealing surface.

6. The coupling of claim 5 in which said tapered sealing surface of said body is positioned axially inwardly from the wedging surface so that said collet engages the wedging surface before the conduit sealing surface engages the body sealing surface.

7. A coupling comprising a body having a sealing surface and a wedging surface, a tubular member having a sealing surface and a tapered thread, a collet positioned about said member and having a continuous circular internally threaded portion threaded on the largest diameter portion of said tubular member and a first and a second axially extending slotted extensions, said collet further having a connecting threaded section within said first extensions for incremental engagement with said tapered thread of said tubular member, and a clamping member for engaging said body and said second extensions to force both of said sealing surfaces into engagement and said first extensions of said collet against said wedging surface, at least one of the mutually contacting surfaces between said clamping member and said second extension being inclined toward the axis of said coupling to cause said second slotted extension to pivot inwardly about said circular portion, the wedging surface causing contraction of said first extension for increasing the frictional contact with said body for resisting rotation of said collet during positioning of said clamping member.

References Cited by the Examiner

UNITED STATES PATENTS

| | | | |
|---|---|---|---|
| 643,615 | 2/1900 | Nickerson | 151—16 |
| 1,257,852 | 2/1918 | Hall | 285—322 |
| 1,525,233 | 2/1925 | Erickson | 285—332.1 X |
| 2,016,262 | 10/1935 | Arey et al. | 285—332 |
| 2,452,890 | 11/1948 | Wolfram | 285—382.7 |
| 2,907,589 | 10/1959 | Knox | 285—355 X |
| 3,112,131 | 11/1963 | Campbell | 285—382.7 |

FOREIGN PATENTS

| | | |
|---|---|---|
| 878,250 | 10/1942 | France. |
| 884,283 | 4/1943 | France. |
| 1,101,839 | 4/1955 | France. |
| 17,452 | 7/1914 | Great Britain. |

CARL W. TOMLIN, *Primary Examiner.*